United States Patent [19]

Abbott

[11] Patent Number: 4,501,111
[45] Date of Patent: Feb. 26, 1985

[54] CRANBERRY HARVESTER

[76] Inventor: Lee W. Abbott, Box No. 1, Speedwell, Chatsworth, N.J. 08019

[21] Appl. No.: 418,723

[22] Filed: Sep. 16, 1982

[51] Int. Cl.³ ............................................. A01D 46/28
[52] U.S. Cl. ......................................... 56/8; 56/15.8; 56/11.9; 56/330
[58] Field of Search .......................... 56/8, 9, 11.2, 15.8, 56/15.9, 208, 214, 330, DIG. 10, 6, 7, 13.6, 13.7, 11.9, 14.9, 328 R

[56] References Cited

U.S. PATENT DOCUMENTS

| 3,121,302 | 2/1964 | Northcote et al. | 56/13.6 |
| 3,410,063 | 11/1968 | Speiser | 56/7 |
| 3,661,096 | 5/1972 | Kayserling | 105/135 |
| 4,135,349 | 1/1979 | Schwertner | 56/6 |
| 4,218,864 | 8/1980 | Allemeersch et al. | 56/11.2 |
| 4,330,981 | 5/1982 | Hall et al. | 56/7 |
| 4,341,059 | 7/1982 | Gerzanich | 56/15.8 |

Primary Examiner—Gene Mancene
Assistant Examiner—David L. Tarnoff

[57] ABSTRACT

An apparatus primarily adapted for removing cranberries from vines in a flooded bog bed includes a self-propelled, wheeled chassis and at least a pair of forwardly mounted, transversely extending reel assemblies. Each reel assembly includes a support frame having a base portion and a pair of arms. A reel is rotatably supported on the arms of the support frame. The reel includes an elongated shaft and a plurality of spaced discs interconnected by rods. A trunnion drive motor is secured to one of the arms and is directly coupled to the shaft to rotate the reel during harvesting operations. The base portion of the frame is pivotally secured to a spindle support arm at a free end thereof. The opposite end of the spindle support arm is pivoted to the wheeled chassis. The reels may pivot about an axis transverse to the base portion of the frame and move vertically to conform to the bog bed. An expansible chamber motor is connected to the spindle support arm to control the pressure the reel exerts on the bed, to raise the reel for cleaning purposes and to pivot the reel to a vertical position about a pivot arm for over-road travel.

29 Claims, 7 Drawing Figures

CRANBERRY HARVESTER

BACKGROUND OF THE INVENTION

The present invention relates to harvesting apparatus and more particularly to a self-propelled device primarily adapted for removing cranberries from the vines of a flooded cranberry bog.

Cranberries grow on vines which are typically and preferably six to eight inches deep and often up to fourteen inches. In commercial cranberry growing operations, marsh areas or bogs are divided into relatively flat beds surrounded by dikes. The cranberry vines grow within the beds which may be flooded to protect the berries from frost. The beds are also flooded during harvesting operations to raise the vines. During harvesting, the berries are removed from the vines and float on the surface of the water. The berries may then be collected and removed for transport to a processing facility.

Various proposals have been made for removing the cranberries from the relatively thick and tangled vine "carpets" in the bog beds. In one approach, a raking machine including a plurality of fingers or tines is moved through the bog. The fingers move under the berries and hold them while the vehicle moves, causing separation of the berries from the vines. These machines may deposit the berries into boats which are towed behind the vehicle. The boats are then removed from the bog and dumped into a truck.

Raking machines have relatively low production rates or operation speeds. Such devices are typically used when the berries will be sold as fresh fruit, since the raking action of the machine limits damage to or bruising of the berries. Examples of such prior devices may be found in U.S. Pat. No. 1,483,725 entitled BERRY STRIPPING MACHINE and issued on Feb. 12, 1924 to Harrison; U.S. Pat. No. 1,533,644 entitled CRANBERRY HARVESTER and issued on Apr. 14, 1925 to Gebhardt; U.S. Pat. No. 1,629,831 entitled CRANBERRY HARVESTING APPARATUS and issued on May 24, 1927 to Maglathlin; U.S. Pat. No. 2,524,631 entitled CRANBERRY HARVESTER and issued on Oct. 3, 1950 to Minutillo; and U.S. Pat. No. 2,795,099 entitled CRANBERRY HARVESTING MACHINE and issued on June 11, 1957 to Getsinger.

Cranberries, of course, are also produced on a commercial scale for processing into juice and sauce. In such commercial production, the physical appearance, other than color, is not as critical. The berries may be bruised without having an adverse effect on the ultimate product.

In order to achieve faster harvesting times and increase production, raking type machines are typically not used in such operations. Instead, "beater" harvesters or reel type harvesters are employed due to their higher harvesting rates. Such reel machines are typically selfpropelled vehicles which traverse the bog bed dislodging the fruit which then floats to the surface. The fruit is pushed to a corner or area of the bog and removed by a conveyor or elevator to a transport vehicle.

Wisconsin reel machines include a pair of front drive wheels and a forwardly mounted reel assembly. The reel includes an elongated shaft and a plurality of discs which are positioned longitudinally of the shaft. The discs may be open spoked structures or solid wheel or disclike members. The solid discs may be used in any type of bog bed. A plurality of equally spaced circumferentially arranged horizontal bars extend between adjacent discs at their peripheries and inside hoop. The bars are staggered at alternate pairs of discs to eliminate "bouncing" as the reels are rotated. A drive motor mounted on the wheel chassis is connected to the reel through an open chain and sprocket or belt and pulley arrangement. As the vehicle traverses the bog, the reel rotates at a speed greater than the vehicle speed. This differential action of the reel relative to speed of ground travel dislodges the berries from the vines. An example of a reel-type harvester may be found in U.S. Pat. No. 3,672,140 entitled CRANBERRY HARVESTING APPARATUS and issued on June 27, 1972 to Furford.

In harvesting operations, it has been found that the cranberry vines are somewhat fragile and may be damaged if the reel exerts too much pressure on the vines during the harvesting operation. Further, weeds, vines and the like may become entangled on the open reels and the reel must be cleaned for proper operation and thorough harvesting. Chain and sprocket power transmission arrangements for driving the vehicle drive wheels and for rotating the reel may also become entangled with weeds, vines and the like. The cleaning operations must typically be manually performed in order to properly remove the entangled debris.

SUMMARY OF THE INVENTION

In accordance with the present invention, a unique cranberry harvesting apparatus and reel assembly are provided which eliminate problems heretofore encountered with entanglement of weeds, vines and the like with the reel drive mechanism. The apparatus permits the reel to be raised in a horizontal position and rotated in an opposite direction for easy removal of weeds and the like and permits pressure exerted by a reel on the bog bed to be readily controlled. Further, the apparatus in accordance with the present invention permits the reel to be raised to a second transport position for over-road travel.

Essentially, the reel assembly includes a support frame having a pair of end members or support arms which rotatably support a reel. The reel includes an elongated shaft having an end rotatably mounted to one of the end members of the frame. The opposite end of the shaft is secured to a drive motor. The drive motor in the preferred form is directly coupled to the shaft and is positioned coaxially therewith. The drive motor is enclosed to prevent entanglement with weeds, vines and the like.

The reel assembly is pivotally mounted to a spindle so that the reel may pivot about an axis transverse to the reel shaft. The spindle is secured to a spindle support arm which is pivoted to the chassis of the harvester. As a result, the reels may rotate about the spindle and move vertically to conform to the cranberry bed. Provision is made for raising the reel assembly with respect to the bed in a controlled and variable fashion to control the aggressiveness or pressure of the reel on the vines. In the preferred form, a fluid actuated motor is connected to the spindle support arm.

Provision is also made for raising the reel to a first, horizontal position at which the reel drive motor may be reversed to dislodge weeds and the like. Maintenance of the reel may be performed in this first, horizontal position. Provision is further made for raising the reel and pivoting it about a fixed pivot point to an essentially upright position for transport or over-road travel.

In the preferred form, a pair of reel assemblies are mounted at the forward end of the self-propelled vehicle and extend outwardly in an outrigger fashion or transversely to the longitudinal axis of the vehicle. Since the reels may be raised to an essentially vertical position for transport, problems are not encountered with moving the harvester from bog bed to bog bed. Further, problems heretofore experienced with weed and vine entanglement in the power transmission or drive arrangement are eliminated. The pressure or aggressiveness that the reel exerts on the rather fragile cranberry vines may be controlled and damage to the vines during harvesting may be significantly reduced.

The cranberry harvester in accordance with the preferred embodiment of the invention achieves significantly increased harvesting or cranberry stripping rates when compared to prior harvesting apparatus. The harvester, since the reels may conform to the configuration of the cranberry beds, also insures more complete removal of the berries from the vines and hence higher yields. The drive wheels of the vehicle and the reel drive motors are preferably hydraulic in nature. The independently driven drive wheels provide high vehicle maneuverability. The drive wheels may be driven in opposite directions for turning purposes to minimize or reduce damage to the cranberry vines by following vine training pattern. Vines must be harvested the same direction each year.

DETAILED DESCRIPTION OF THE PREFERRED EMBODIMENT

Figure 1:
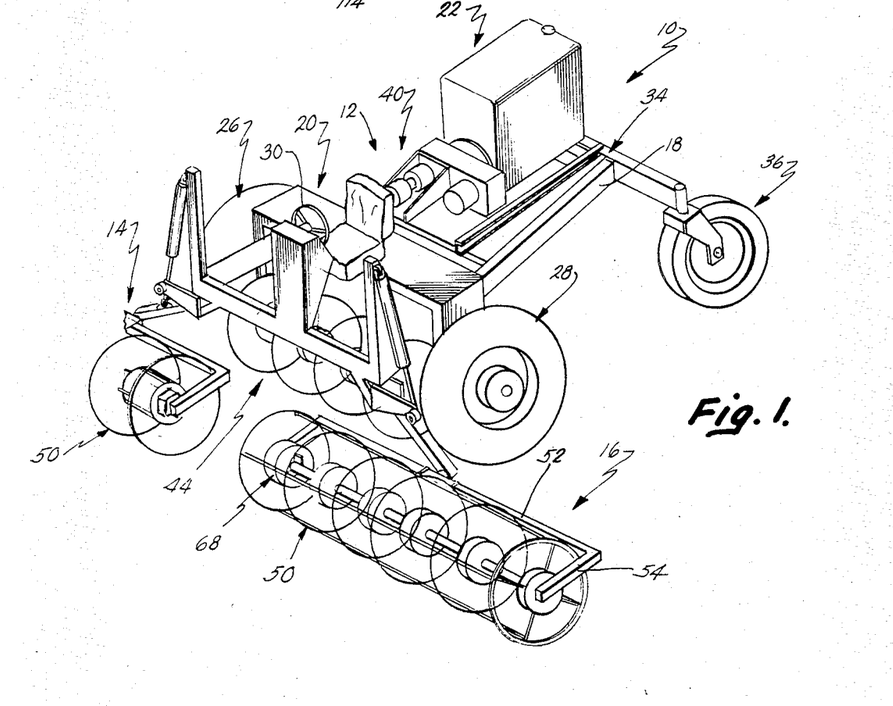
FIG. 1 is a fragmentary, perspective view of a harvesting apparatus in accordance with the present invention.

A wet bog harvesting apparatus in accordance with the preferred embodiment of the invention is illustrated in FIG. 1 and generally designated 10. Apparatus 10 includes a self-propelled vehicle 12 and a pair of reel assemblies 14, 16. Reel assemblies 14, 16 are supported at the forward end of the vehicle 12 and extend outwardly relative to a longitudinal axis of the vehicle in an outrigger fashion. It is also presently preferred that the harvester 10 include a centrally mounted subreel assembly 44 positioned generally under the operator station 20.

Vehicle 12 includes a main chassis or frame 18 which supports a vehicle operator station 20. Supported on chassis 18 is a motor 22 which may be an internal combustion engine. Secured to chassis 18 are a pair of forward, driven wheels 26, 28. Wheels 26, 28 are steerable, as explained below, at the operator station 20. Secured to the rear end of chassis 18 is a cross piece or beam 34. It is preferred that the beam 34 be pivoted to chassis 18 at the center point of the beam. Castored to beam 34 are a pair of freely rotatable rear wheels 36. The beam is pivotal so that wheels 36 will readily conform to the bog bed surface.

It is presently preferred that engine or motor 22 drive a hydraulic pump and control subassembly generally designated 40. Each of the driven wheels 26, 28 are preferably independently driven by their own hydraulic motors (not shown) operatively connected to the subassembly 40. A fluid control system included with the subassembly 40 permits variable speed and reverse rotation of the wheels 26, 28. As a result, vehicle 12 is highly maneuverable in the bog beds. This also minimizes damage to the cranberry vines as the vehicle turns and traverses the bed. Subassembly 40 also provides a source of fluid under pressure for operation of the reels 14, 16, as explained in more detail below.

REEL ASSEMBLY

Figure 3:
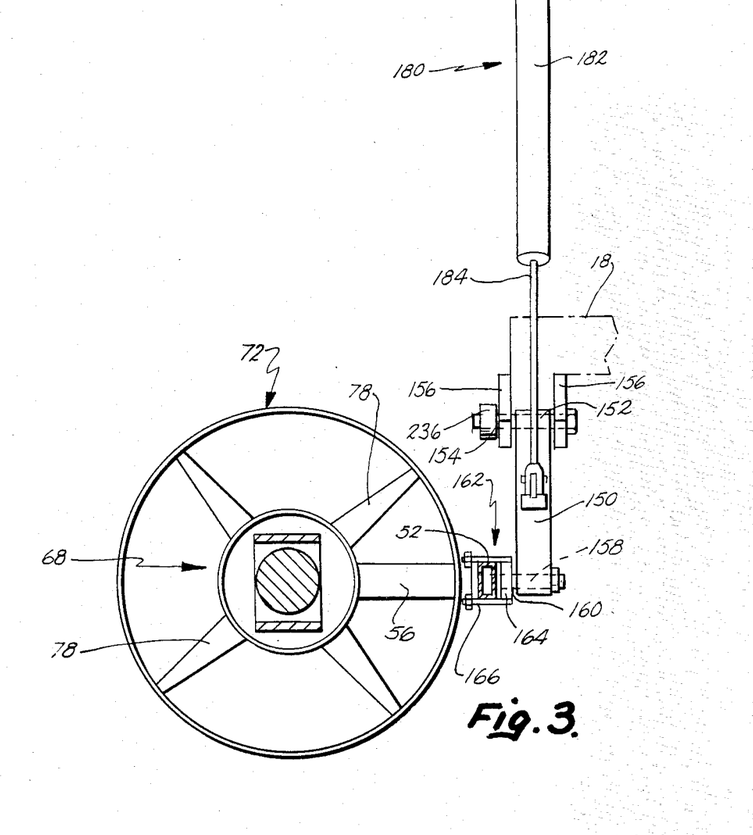
FIG. 3 is a cross-sectional view taken generally along line III—III of FIG. 2.
Figure 4:
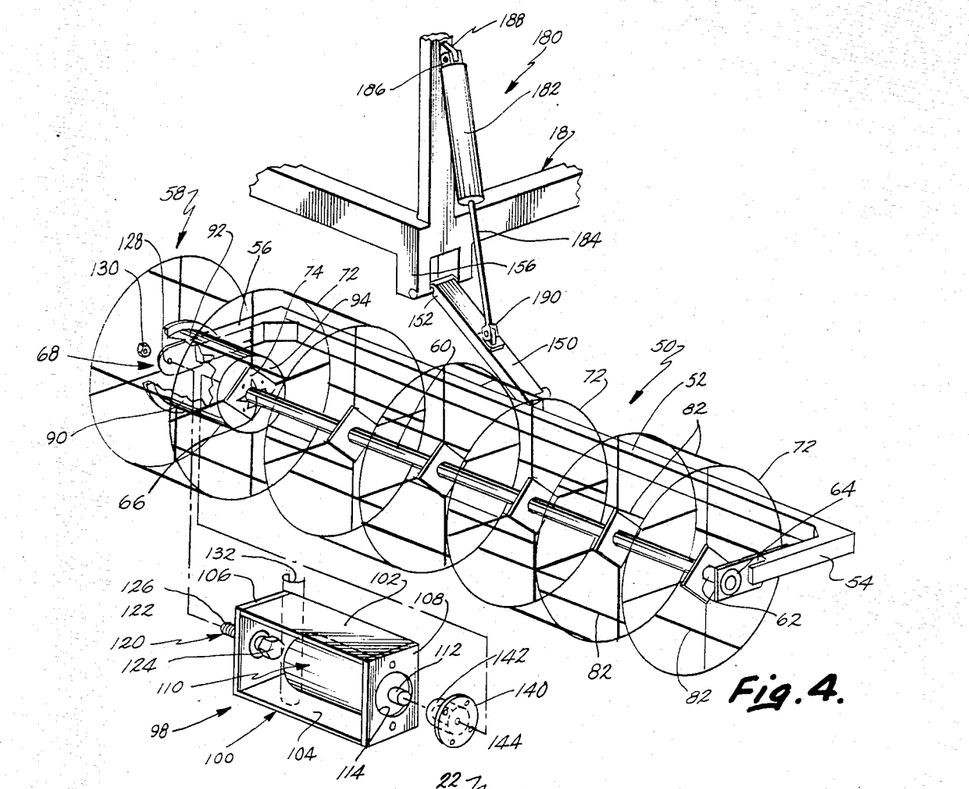
FIG. 4 is a fragmentary, exploded, perspective view showing the reel assembly drive and the mounting of the reel assembly to the vehicle chassis.
Figure 5:
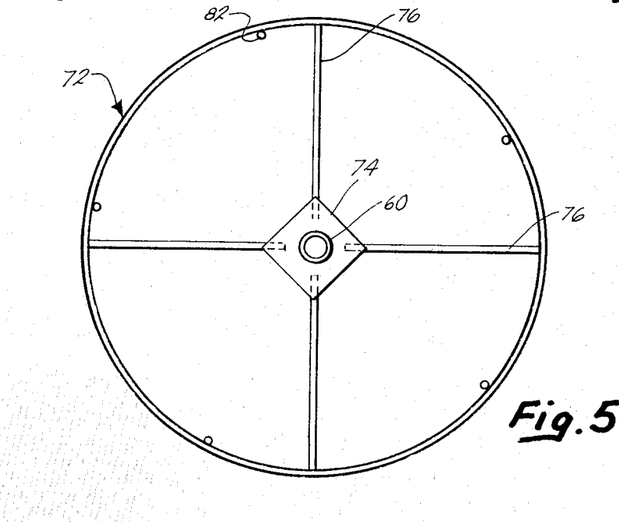
FIG. 5 is a cross-sectional view of the reel taken generally along line V—V of FIG. 2.

The reel assemblies which dislodge the berries from the vines as the harvester 10 traverses the bog are best illustrated in FIGS. 3, 4 and 5. As seen therein, each reel assembly includes a reel support frame 50. The reel support frame is generally U-shaped in plan view and includes an elongated base or cross beam 52 and a pair of support arms or end members 54, 56. Rotatably mounted on frame 50 is a water reel 58. Reel 58 includes an elongated shaft 60. An end 62 of the shaft is rotatably supported on arm 54 by a self-aligning, conventional bearing subassembly 64. The opposite end 66 of shaft 60 is secured to arm 56 through a fully enclosed drive 68.

Figure 6:
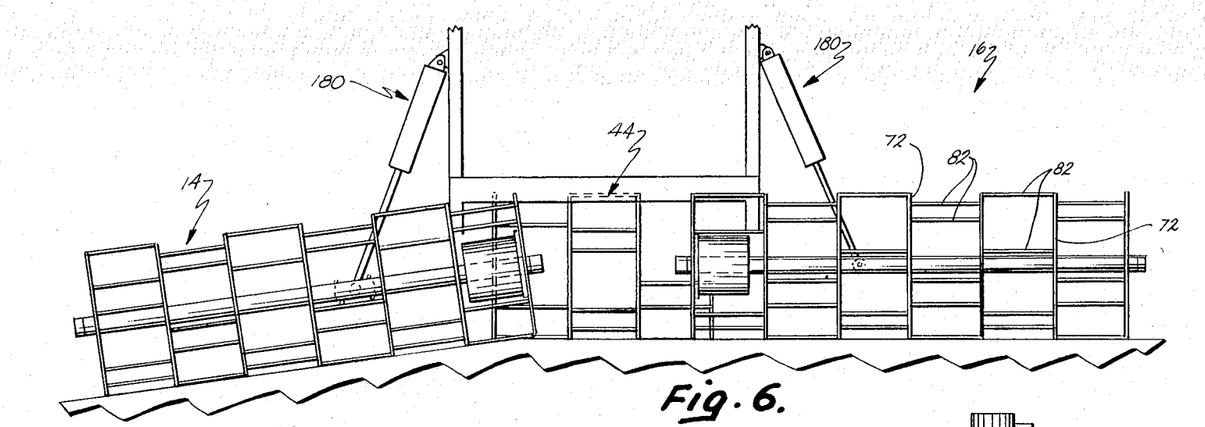
FIG. 6 is a front, elevational view showing the reel assemblies on a bed surface.

In the embodiment illustrated in FIGS. 3, 4 and 5, each reel includes a plurality of longitudinally spaced rings or discs 72 which are nonrotatably secured to the shaft 60. Each disc 72 includes a central hub or mounting plate 74 (FIG. 5) which is welded or otherwise secured to the central shaft 60. Extending radially outwardly from shaft 60 are a plurality of spokes 76. Spokes 76 may be rod-like in configuration, as seen in FIG. 5, or in the alternative, they may be generally flat, tapered members 78, as seen in FIG. 3. Adjacent ones of the rings or discs 72 are interconnected in pairs by connecting rods or wires 82. As best seen in FIG. 5, each rod 82 extends parallel to the central support shaft 60 and the rods are equally spaced around the circumference of a disc 72 at the periphery thereof. The rods 82 are staggered with respect to alternate pairs 72 of the discs. This is best seen in FIGS. 4 and 6. Staggering of the bars is done to eliminate the "bouncing" action which would occur as the apparatus traverses the bogs if the bars or rods were not staggered. The "open" reels of FIGS. 3 and 5 are satisfactory for generally weed-free bogs. In nonweed-free bogs, "solid" discs without the spokes are preferred.

End 66 of shaft 60 adjacent arm 56 is welded or otherwise suitably secured to a hub or mounting plate 74 of the next to the last of the discs 72. Extending between the last pair of discs 72 is a generally cylindrically shaped housing 90. Housing 90 includes a cylindrical sidewall 92 and a closed end 94. Disposed within housing 90 and fully enclosed thereby is a motor subassembly 98.

Motor subassembly 98 includes a box-like frame 100. Frame 100 includes elongated sides 102, 104 and ends 106, 108. A drive motor 110, which in the preferred form is hydraulically actuated, is mounted within frame 100 and bolted to end 108 thereof. Motor 110 includes an output shaft 112 extending through an aperture 114 in end wall 108.

Frame 100 is secured to support arm 56 by a self-aligning or multi-axis point 120. In the form illustrated, joint 120 includes a ball portion 122 secured to an innerface of end 106 and a socket member 124 which extends through the ball 122. Socket member 124 includes a head and a threaded shaft 126. Shaft 126 extends through an aperture 128 and arm 56 and is secured to the arm by a nut 130.

A torque arm 132 is secured to the box frame 100. As is apparent from FIG. 4, when the motor subassembly 98 is disposed within the housing 90, the torque arm 132 will engage a portion of the side member 56. Torque arm 132 prevents rotation of the box frame and motor during motor operation.

The motor output shaft 112 is directly coupled to elongated shaft 60 of the reel. A coupling member 140 includes a hub 142 secured to output shaft 112 and a flange 144. Flange 144 is bolted to the mounting hub or plate 74 of a disc 72 at the closed end 94 of housing 90. When mounted within the housing, the output shaft 112 is coaxial with the elongated shaft 60.

The drive motor mount of the present invention fully encloses the motor. This prevents or substantially alleviates the entanglement of weeds, vines and the like with the reel drive. Further, the drive arrangement in accordance with the present invention eliminates exposed chains, sprockets and the like which have heretofore been subject to weed, grass and vine fouling. The hydraulic motor drive permits the reel to be driven in both a forward and reverse direction. As explained below, rotation in a reverse direction cleans the reels of weeds and the like.

MOUNTING AND LIFT MECHANISM

Each reel assembly 14, 16 is secured to the chassis 18 so that it may pivot about a transverse axis and also move vertically relative to the chassis. The mounting arrangement is best seen in FIGS. 3 and 4. As shown therein, a spindle support arm or link 150 has an end 152 pivoted to chassis 18 by a pivot pin or bolt 154 which extends through ears 156 secured to the chassis. The opposite or free end 158 of arm 150 (FIG. 3) supports a horizontally extending spindle 160. Spindle 160 pivotally supports the base portion or cross piece 52 of the support frame 50 at a connecting structure or pivot member 162.

Structure 162 includes a generally vertical plate 164 to which the spindle is pivotally connected. Plate 164 is clamped to base portion 52 by suitable rods and nuts 166. The connecting arrangement 162 permits the base 52 to be shifted longitudinally with respect to the pivot spindle 158. It is preferred that each reel assembly be pivotally supported on a spindle 158 at the approximate center of gravity of the reel assembly. Spindle arm 150 by pivoting about pin 154 permits each reel assembly to move vertically with respect to the bog beds. Also, spindle 160 permits the entire reel assembly to pivot about an axis transverse to base 52. This multi-axis motion of the reel assemblies, as illustrated in FIG. 6, permits each reel assembly to conform more closely to the bog bed surface. This assures more complete removal of berries from the cranberry beds.

Figure 2:
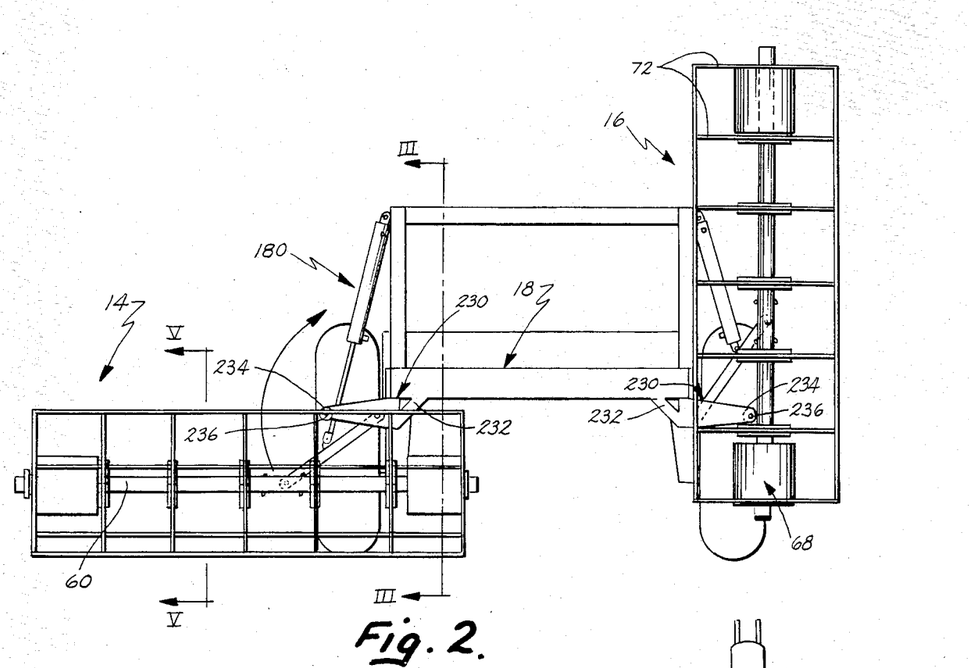
FIG. 2 is a front, elevational view of the harvesting apparatus wheeled chassis and reel assemblies.

In accordance with the present invention, provision is made for varying the pressure that the reels exert on the cranberry beds during harvesting operations. As seen in FIGS. 3 and 4, it is presently preferred that an expansible motor actuator 180 be provided. Actuator 180, as illustrated in FIGS. 2 and 4, is a piston cylinder subassembly including a cylinder 182 and an extensible and retractable rod 184. Cylinder 182 at an end 186 is pivoted to chassis 18 by a connection 188. Rod 184 is pivotally connected to spindle support arm 150 intermediate the ends thereof by a clevis connection 190. Extension of rod 184 from cylinder 182 will move the entire reel assembly downwardly to increase the pressure which the reel may exert on the bed. Conversely, retraction of the rod 184 will lift arm 150 and hence the entire reel assembly to reduce the pressure exerted on the cranberry bed.

Figure 7:
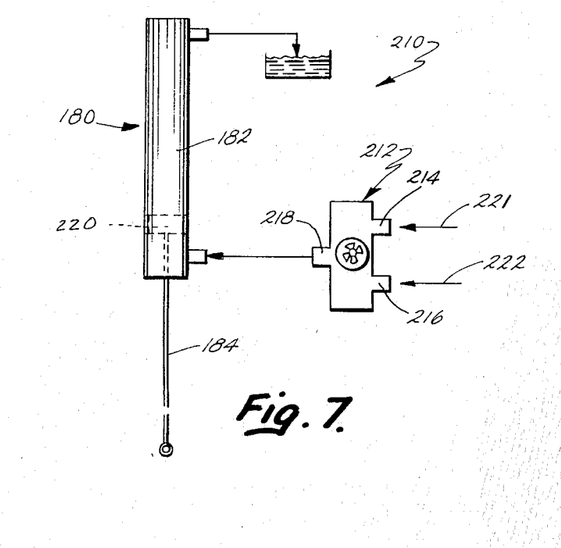
FIG. 7 is a schematic of the fluid actuated motor and control system incorporated in the harvester.

The piston cylinder assemblies 180 are operably connected to a hydraulic control system which is schematically illustrated in FIG. 7 and generally designated 210. Control system 210 is connected to pump subassembly 40 and includes a control valve 212. Control 212 includes two inlets 214, 216 and an outlet 218. Outlet 218 is fluidly connected to clyinder 182 of the double-acting piston cylinder arrangement 180 below a piston 220 which is connected to rod 184. Inlet 214 is connected to a source of high pressure fluid 221. Inlet 216 is connected to a low pressure, controllable source of fluid under pressure 222. When output 218 is connected to inlet 216, the low pressure fluid will enter the cylinder 182 to controllably lift the reel assembly to achieve the desired bed pressure. The reels are in effect in a floating position. When output 218 is connected to the source of high pressure fluid 221 through valve 212, rod 184 may be retracted for weed dislodgement and over-the-road travel, as explained in more detail below.

As seen in FIGS. 2 and 3, extending outwardly from chassis 18 and generally transversely thereto are a pair of pivot point defining arms or members 230. Each member 230 has an end 232 fixed to chassis 18. A free end 234 defines a pivot point which supports a pivot roller 236. As seen in FIG. 3, the pivot point and pivot roller 236 are positioned in spaced, juxtaposed relationship to base portion 52 of the reel support frame 50. Pivot point 236 is inboard of the pivotal connection of frame 50 to the spindle arm 150.

Actuation of the piston cylinder 180 through the high pressure source 221 initially raises each reel assembly 14, 16 to a first, horizontal position at which the base 52 of frame 50 just contacts pivot roller 236. The pivot roller 236 provides directional stability and will hold the reel in that horizontal position. When so positioned, the reel may be worked on and weeds are easily dislodged. In order to dislodge weeds, the operator need merely reverse the direction of rotation of each reel and the weeds will fall from the reel subassemblies. It is preferred that the reels be balanced on the spindle so that there is a slight overweight at the outer end. The "off balance" causes the outer end of the reel to trail the inner end when the reel is lifted by actuator 180.

Further retraction of the rod 182 will cause the reel assemblies to pivot about rollers 236. Full retraction, as seen in FIG. 2 with respect to reel assembly 16, will position the reel essentially vertically alongside the chassis 18. When the reels are put in this position, the harvester can easily travel over-road between bogs and the like.

The subreel assembly 44 which is positioned beneath the operator station 20 is essentially the same as reels 14, 16. This subreel assembly would include a plurality of discs 72 nonrotatably secured to a central shaft. A trunnion drive motor (not shown) would also be provided to operate the discs.

OPERATION

In use, the operator steers the harvester across the bog bed. The reels 14, 16 and 44 are rotated to dislodge the berries from the vines. The hydraulic subassembly provides power and directional control. When it is necessary to clean the reels, actuator 180 raises the reels until frames 50 contact the pivot rollers 236. The direction of rotation is reversed and the weeds readily fall off. The pressure of the reels on the bed is readily controlled by actuator 180 and the hydraulic control system. The reels are easily raised for transport purposes.

The cranberry harvester in accordance with the present invention is extremely maneuverable in the cranberry bogs. The hydraulic drive arrangement permits single lever operation for speed and directional reverse. The four wheel arrangement with the rear wheels in line with the front wheels reduces swirling, disturbance of vines and the like. The hydraulic motors or pressure compensated flow controls (bidirectional) permit automatic control of the reel speed. The adjustable reel pressure feature allows for thorough picking in heavy vine growth. The pivotable and shiftable nature of the reels and their mounting to the chassis also insure conformance of the reels to the bed surface. The harvester may pick cleaner and faster than has heretofore been obtainable. The fully enclosed trunnion reel drive arrangement eliminates belts, chains and flexible couplings and their concomitant maintenance with weed entanglement problems.

In view of the foregoing description, those of ordinary skill in the art will undoubtedly envision various modifications which would not depart from the patentable concepts disclosed herein. For example, the floating and variable pressure action of the reels could be obtained through substitution of a cable lift arrangement and spring support for the piston cylinder actuator 180 illustrated. Springs extending between the chassis 18 and the spindle support arms 150 could suspend the reels and control the maximum pressure that the reels exert on the cranberry bed. It is preferred, however, that the fluid actuator means be used due to increased efficiency, increased control and ease of operation. Further, as set forth above, solid discs could be substituted for spoked reel discs illustrated in the preferred embodiment. Therefore, it is expressly intended that the above description should be considered as that of the preferred embodiment. The true spirit and scope of the present invention may be determined by reference to the appended claims.

The embodiments of the invention in which an exclusive property or privilege is claimed are defined as follows:

1. A wet harvesting apparatus to remove fruit from a bed of vines, said harvesting apparatus comprising:
   a wheeled chassis;
   a reel support frame having a base and a pair of legs;
   mounting means operatively connected between said support frame and said chassis for mounting said frame to said chassis so that said frame may tilt and move vertically to conform to the surface of the bed;
   a harvesting reel rotatably supported from the legs of said support frame;
   drive means connected to said reel for rotating said reel to remove fruit from the vines; and
   reel lift means connected to said support frame for raising said reel for cleaning purposes and for over-road travel, said reel lift means including a pivot arm extending from said chassis and having an end defining a pivot point positioned to contact said base of said support frame as said reel is raised.

2. A wet harvesting apparatus as defined by claim 1 wherein said mounting means comprises:
   a fixed spindle secured to said chassis; and
   a shiftable pivot member on said base, said spindle being retained by said pivot member to said frame whereby said frame may pivot about said spindle and be shifted transversely of said spindle.

3. A wet harvesting apparatus as defined by claim 2 wherein said mounting means further comprises:
   an elongated mounting arm having an end pivoted to said chassis and another end supporting said spindle.

4. A wet harvesting apparatus as defined by claim 1 wherein said reel lift means includes means for controlling the aggressiveness of said reel on said vine bed.

5. A wet harvesting apparatus as defined by claim 4 wherein said reel lift means comprises:
   a piston cylinder pivotally connected to said chassis and having an extensible and retractable rod, said rod being pivotally connected to said mounting means whereby retraction of said rod will raise said reel support frame.

6. A wet harvesting apparatus as defined by claim 5 wherein said means for controlling comprises:
   a source of fluid under variable pressure connected to said piston cylinder for controlling the pressure said reel exerts on the bed during harvesting operations.

7. A wet harvesting apparatus to remove fruit from a bed of vines, said harvesting apparatus comprising:
   a wheeled chassis;
   a reel support frame having a base and a pair of legs;
   mounting means operatively connected between said support frame and said chassis for mounting said frame to said chassis so that said frame may tilt and move vertically to conform to the surface of the bed;
   a harvesting reel rotatably supported from the legs of said support frame;
   drive means connected to said reel for rotating said reel to remove fruit from the vines; and
   reel lift means connected to said support frame for raising said reel for cleaning purposes and for over-road travel, said reel lift means including means for controlling the aggressiveness of said reel on said vine bed, said reel lift means further comprising:
   a piston cylinder pivotally connected to said chassis and having an extensible and retractable rod, said rod being pivotally connected to said mounting means whereby retraction of said rod will raise said reel support frame, said means for controlling comprising a source of fluid under variable pressure connected to said piston cylinder for controlling the pressure said reel exerts on the bed during harvesting operations, and wherein said reel lift means further comprises:
   a pivot arm extending from said chassis and having a free end defining a pivot point, said pivot point being positioned to contact said base of said support frame as said reel support frame is lifted to a first horizontal position, said frame pivoting about said pivot point as said support frame is raised to a second, generally vertical position for over-road travel.

8. A wet harvesting apparatus as defined by claim 7 further including a roller supported on said pivot arm at said free end.

9. A wet harvesting apparatus as defined by claim 1 wherein said drive means comprises:
- a drive motor secured to said frame and having an output shaft coaxial with and directly coupled to said reel; and
- a housing encircling said drive motor to prevent weeds from being picked up by said motor.

10. A wet harvesting apparatus as defined by claim 9 wherein said drive means further comprises:
- a box-shaped frame having end walls, said motor being secured to one of said end walls with said output shaft extending therethrough;
- a multi-axis joint secured to another of said end walls and said support frame; and
- a torque arm secured to said box-shaped frame and engaging said support frame.

11. A wet harvesting apparatus as defined by claim 10 wherein said reel comprises:
- an elongated shaft;
- a plurality of discs secured in spaced relationship along said shaft; and
- a plurality of circumferentially arranged rods extending between adjacent discs at the peripheries of said discs, said housing of said drive means being secured to one of said discs so that said housing rotates with said discs and encloses said drive motor.

12. A wet harvesting apparatus as defined by claim 11 wherein said drive motor is hydraulically operated.

13. A wet harvesting apparatus as defined by claim 12 wherein said mounting means comprises:
- a fixed spindle secured to said chassis; and
- a shiftable pivot member on said base, said spindle being retained by said pivot member to said frame whereby said frame may pivot about said spindle and be shifted transversely of said spindle.

14. A wet harvesting apparatus as defined by claim 13 wherein said mounting means further comprises:
- an elongated mounting arm having an end pivoted to said chassis and another end supporting said spindle.

15. A wet harvesting apparatus as defined by claim 14 wherein said reel lift means includes means for controlling the aggressiveness of said reel on said vine bed.

16. A wet harvesting apparatus as defined by claim 15 wherein said reel lift means comprises:
- a piston cylinder pivotally connected to said chassis and having an extensible and retractable rod, said rod being pivotally connected to said mounting means whereby retraction of said rod will raise said reel support frame.

17. A wet harvesting apparatus as defined by claim 16 wherein said means for controlling comprises:
- a variable source of fluid under pressure connected to said piston cylinder for controlling the pressure said reel exerts on the bed during harvesting operations.

18. A wet harvesting apparatus to remove fruit from a bed of vines, said harvesting apparatus comprising:
- a wheeled chassis;
- a reel support frame having a base and a pair of legs;
- mounting means operatively connected between said support frame and said chassis for mounting said frame to said chassis so that said frame may tilt and move vertically to conform to the surface of the bed;
- a harvesting reel rotatably supported from the legs of said support frame;
- drive means connected to said reel for rotating said reel to remove fruit from the vines; and
- reel lift means connected to said support frame for raising said reel for cleaning purposes and for over-road travel, said drive means comprising:
- a drive motor secured to said frame and having an output shaft coaxial with and directly coupled to said reel;
- a housing encircling said drive motor to prevent weeds from being picked up by said motor;
- a box-shaped frame having end walls, said motor being secured to one of said end walls with said output shaft extending therethrough;
- a multi-axis joint secured to another of said end walls and said support frame; and
- a torque arm secured to said box-shaped frame and engaging said support frame, and wherein said reel comprises:
- an elongated shaft;
- a plurality of discs secured in spaced relationship along said shaft; and
- a plurality of circumferentially arranged rods extending between adjacent discs at the peripheries of said discs, said housing of said drive means being secured to one of said discs so that said housing rotates with said discs and encloses said drive motor, said drive motor being hydraulically operated, said mounting means comprising:
- a fixed spindle secured to said chassis; and
- a shiftable pivot member on said base, said spindle being retained by said pivot member to said frame whereby said frame may pivot about said spindle and be shifted transversely of said spindle, said mounting means further comprising:
- an elongated mounting arm having an end pivoted to said chassis and another end supporting said spindle, said reel lift means including means for controlling the aggressiveness of said reel on said vine bed, said reel lift means further comprising:
- a piston cylinder pivotally connected to said chassis and having an extensible and retractable rod, said rod being pivotally connected to said mounting means whereby retraction of said rod will raise said reel support frame, said means for controlling comprising:
- a variable source of fluid under pressure connected to said piston cylinder for controlling the pressure said reel exerts on the bed during harvesting operations, and wherein said reel lift means further comprises:
- a pivot arm extending from said chassis and having a free end defining a pivot point, said pivot point being positioned to contact said base of said support frame as said reel support frame is lifted to a first horizontal position, said frame pivoting about said pivot point as said support frame is raised to a second generally vertical position for over-road travel.

19. An apparatus for harvesting cranberries from a bog bed, said apparatus comprising:
- a wheeled chassis;
- a reel support frame having a base portion and a pair of end members;

a reel rotatably supported on said frame at said end members;

an enclosed drive means connected to said reel for rotating said reel; and mounting means interconnecting said chassis and said support frame for mounting said frame to said chassis and for permitting pivotal motion of said frame about an axis transverse to said reel and vertical floating movement of said support frame relative to said chassis, said mounting means comprising:

a spindle support arm having an end pivoted to said chassis and a free end;

a spindle secured to said free end of said support arm; and connecting means on said support frame for connecting said spindle to said support frame at the approximate center of gravity of said support frame, said reel comprising:

an elongated shaft rotatably mounted on said support frame;

a plurality of generally circular members secured to said shaft at longitudinally spaced positions along said shaft;

a plurality of longitudinally extending rods secured to adjacent pairs of discs at the periphery of said discs;

reel lift means connected to said spindle support arm intermediate the ends thereof for lifting said reel support frame relative to said chassis, said reel lift means comprising an expansible chamber motor having an extensible and retractable member connected to said support arm; and a pivot arm having an end fixed to said chassis and a free end positioned to contact said frame as said frame is raised to a first, horizontal position, said frame pivoting about said pivot arm free end as said frame is raised to a second, travel position.

20. An apparatus as defined by claim 19 further including:

a controllable source of pressurized fluid operatively connected to said expansible chamber motor to control the pressure said reel exerts on a bog bed.

21. A cranberry harvester for removing cranberries from vines in a bog bed, said harvester comprises:

a wheeled vehicle;

at least one harvesting reel means for contacting said vines and dislodging cranberries therefrom, said reel means including a support frame; and fluid actuated means operatively connecting said reel means and said vehicle for raising and lowering said reel means in a controlled floating manner to control the pressure said reel means exerts on said vines to limit damage to the bog bed during harvesting operations, said fluid actuated means comprising:

a support arm pivoted to said vehicle and to said reel means;

an expansible chamber motor connected to said support arm; and a source of fluid under controllable pressure for actuating said expansible chamber motor to cause said motor to raise and lower said reel means, said cranberry harvester further including:

a pivot arm having an end fixedly secured to said vehicle and a free end; and a roller secured to said free end of said pivot arm and positioned to be engaged by said reel means as said motor raises said reel to a position at which weeds and the like may be dislodged from said reel means, said roller providing directional stability to said reel means.

22. A cranberry harvester as defined by claim 21 wherein said reel means comprises:

a generally U-shaped support frame having a base and end arms;

an elongated reel shaft having an end rotatably secured to one of said end arms;

a drive motor secured to the other of said end arms and having an output shaft coupled to the other end of said reel shaft;

a plurality of discs secured to said elongated shaft in longitudinally spaced relationship; and a plurality of rods interconnecting said discs.

23. A cranberry harvester as defined by claim 22 wherein said reel means further comprises:

a housing secured to said reel shaft and enclosing said drive motor.

24. A self-propelled harvesting vehicle for use in bog beds including a chassis, a pair of steerable drive wheels at the front of the chassis, a cross beam at the rear of the chassis supporting a pair of freely rotatable rear wheels, and a pair of harvesting reel means supported at the front of said chassis and extending outwardly, transversely of said chassis in outrigger fashion, each of said reel means comprising:

a support frame having a base and a pair of end members;

a harvesting reel rotatably supported at said end members;

an enclosed reel drive means mounted to one of said end members for rotating said harvesting reel in a first direction for harvesting and a second direction for removing weeds and the like from said reel;

mounting means between said frame and said chassis for permitting vertical and pivotal movement of said frame so that the frame may move vertically and pivot about a transverse axis to conform to the bog surface;

fluid actuated means connected to said mounting means for raising said frame to control the pressure said reel exerts on said bog bed, said fluid actuated means comprising an expansible chamber motor having a reciprocal rod connected to said support arm intermediate its ends; and a fixed pivot point arm having an end fixed to said frame and a free end positioned to contact said base of said support frame.

25. A self-propelled harvesting vehicle for use in bog beds including a chassis, a pair of steerable drive wheels at the front of the chassis, a cross beam at the rear of the chassis supporting a pair of freely rotatable rear wheels, and a pair of harvesting reel means supported at the front of said chassis and extending outwardly, transversely of said chassis in outrigger fashion, each of said reel means comprising:

a support frame having a base and a pair of end members;

a harvesting reel rotatably supported at said end members;

an enclosed reel drive means mounted to one of said end members for rotating said harvesting reel in a first direction for harvesting and a second direction for removing weeds and the like from said reel;

mounting means between said frame and said chassis for permitting vertical and pivotal movement of said frame so that the frame may move vertically and pivot about a transverse axis to conform to the bog surface; and fluid actuated means connected to said mounting means for raising said frame to control the pressure said reel exerts on said bog bed, said reel drive means comprising:

a generally cylindrical housing;

a box frame within said housing;

a motor secured to said box frame and having an output shaft extending from said box frame;

a multi-axis joint connecting said box frame to said one of said end members; and a torque arm secured to said box frame and engaging said support frame, said reel comprising:

an elongated shaft having an end secured to said housing;

a plurality of discs mounted on said shaft; and a plurality of bars extending parallel to said elongated shaft and connecting adjacent pairs of said discs at equally spaced points at the peripheries of said discs, said bars being staggered in each alternate pair of discs, said mounting means comprising:

a pivoting support arm having an end pivoted to said chassis and a free end;

a spindle secured to said free end;

means for pivotally connecting said spindle to said base of said support frame and permitting sliding adjustment of said base relative to said spindle, said fluid actuated means comprising an expansible chamber motor having a reciprocal rod connected to said support arm intermediate its ends; and a fixed pivot point arm having an end fixed to said frame and a free end positioned to contact said base of said support frame.

26. A water reel adapted to be mounted on a wheeled chassis for agitating cranberries to remove them from vines in a bog bed, said reel comprising:

a reel frame having a base portion and a pair of end members;

an elongated shaft extending between said end members;

bearing means for rotatably supporting an end of said shaft to one of said end members;

an enclosed drive means connecting the other end of said shaft to the other of said end members for rotating said shaft;

a plurality of discs secured to said shaft in spaced longitudinal relationship along said shaft; and a plurality of circumferentially spaced rods connecting adjacent pairs of said discs, said enclosed drive means comprising:

a housing having an end secured to one of said discs;

a motor frame disposed within said housing;

a self-aligning joint attaching said motor frame to said other of said end members; and a motor secured to said motor frame and having an output shaft directly coupled to said elongated shaft.

27. A water reel as defined by claim 26 further including a torque arm secured to said motor frame and engaging said reel frame.

28. A water reel as defined by claim 27 wherein said self-aligning joint is a ball joint.

29. A water reel as defined by claim 28 wherein said reel frame is generally U-shaped in plan.

* * * * *